(12) United States Patent
Hamano et al.

(10) Patent No.: US 7,088,521 B2
(45) Date of Patent: Aug. 8, 2006

(54) ZOOM LENS SYSTEM

(75) Inventors: Hiroyuki Hamano, Koga (JP); Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/113,583

(22) Filed: Apr. 25, 2005

(65) Prior Publication Data
US 2005/0243438 A1 Nov. 3, 2005

(30) Foreign Application Priority Data
Apr. 28, 2004 (JP) .............................. 2004-132608

(51) Int. Cl.
*G02B 15/14* (2006.01)

(52) U.S. Cl. ....................................... 359/686; 359/689

(58) Field of Classification Search ................. 359/686, 359/689
See application file for complete search history.

(56) References Cited

U.S. PATENT DOCUMENTS

| | | | |
|---|---|---|---|
| 5,568,325 A * | 10/1996 | Hirano et al. ............... | 359/785 |
| 5,872,658 A | 2/1999 | Ori | |
| 6,404,561 B1 | 6/2002 | Isono | |
| 6,594,087 B1 | 7/2003 | Uzawa | |
| 6,759,471 B1 | 7/2004 | Ukuda | |
| 6,829,101 B1 * | 12/2004 | Mihara et al. ............... | 359/687 |

FOREIGN PATENT DOCUMENTS

| | | |
|---|---|---|
| JP | 7-013079 A | 1/1995 |
| JP | 8-248317 A | 9/1996 |
| JP | 2001-21803 A | 1/2001 |

* cited by examiner

*Primary Examiner*—Ricky Mack
*Assistant Examiner*—Joseph Martinez
(74) *Attorney, Agent, or Firm*—Canon U.S.A. Inc. IP Division (57) ABSTRACT

A zoom lens system including, in order from an object side to an image side, a first lens unit of positive optical power, and a second lens unit of negative optical power, followed by a lens component having a lens unit, wherein at least one of the first lens unit and the second lens unit moves during zooming. One of the lens units of the zoom lens system includes a layer made of a material that satisfies the following conditions:

$11 < \nu IT < 27$ $0.2 < \theta IT < 0.4$.

Wherein $\nu IT$ is an Abbe number of the layer, and $\theta IT$ is a partial dispersion ratio for the g-spectral line and f-spectral line of the layer. The layer has an optical power of a sign opposite to that of the lens unit including the layer.

16 Claims, 12 Drawing Sheets

ZOOM LENS SYSTEM

BACKGROUND OF THE INVENTION

1. Field of the Invention

The present invention relates to a zoom lens system suitable, for example, as a photographic optical system for silver-halide film cameras, digital still cameras, video cameras, etc.

2. Description of the Related Art

With the advancement of technologies for high resolution in digital still cameras, a zoom lens serving as a photographic optical system for high-resolution solid-state imaging devices requires not only a monochromatic aberration correction but also a sufficient correction in chromatic aberration. Especially, as a focal length of the zoom lens on the telephoto side becomes long with an increase in zoom ratio (an increase in variable magnification), chromatic aberration is required to be reduced in second-order spectrum as well as first-order achromatism.

Up to the present, there are a number of zoom lenses using extraordinary dispersion glass to correct the second-order spectrum of the axial chromatic aberration on the telephoto side. In addition, as an example of the zoom lens structure suitable for a high zoom ratio, there is a positive lead type zoom lens having a lens unit of positive refractive power disposed closest to the object side.

For example, zoom lenses having four lens units having positive, negative, positive and positive refractive powers, respectively, disposed in order from the object side and using extraordinary dispersion glass are disclosed in Japanese Patent No. 3097399, Japanese Laid-Open Patent Application No. 2002-62478 (corresponding to U.S. Pat. No. 6,594,087), Japanese Laid-Open Patent Application No. 8-248317, and Japanese Laid-Open Patent Application No. 2001-194590 (corresponding to U.S. Pat. No. 6,404,561).

Moreover, zoom lenses using a diffractive optical element, which is more effective in chromatic aberration correction than the extraordinary dispersion glass, are disclosed in Japanese Laid-Open Patent Application No. 9-211329 (corresponding to U.S. Pat. No. 5,872,658).

In addition, Japanese Laid-Open Patent Application No. 2001-74901 (corresponding to European Patent Application EP 1065531 A2) discloses a technology for improving the efficiency of diffraction of a diffraction grating by using a replica material in which fine ITO (indium tin oxide) particles are mixed into a resin.

In addition, Japanese Laid-Open Patent Application No. 2001-21803 discloses a zoom lens having a first lens unit having an aspherical surface formed by a resinous layer to correct monochromatic aberration.

If a diffractive optical element is used in a zoom lens, a larger effect of chromatic aberration correction is obtained than if an extraordinary dispersion glass material is used. However, the diffraction efficiency of a diffraction grating changes depending on angles of incidence of light rays. Therefore, in cases where the diffractive optical element is used in a zoom lens in which a condition of incidence of light rays changes during zooming, the location of the diffractive optical element in the zoom lens may be limited, or the diffraction efficiency may deteriorate during zooming.

Moreover, in cases where an aspherical surface is formed of an ordinary resinous material disclosed in Japanese Laid-Open Patent Application No. 2001-21803, the effect of correction of chromatic aberration cannot be obtained.

SUMMARY OF THE INVENTION

The present invention is directed to greatly improving chromatic aberration in a positive lead type zoom lens system suitable for a high zoom ratio.

In one aspect of the present invention, a zoom lens system includes, in order from an object side to an image side, a first lens unit of positive optical power, a second lens unit of negative optical power, and a lens component including at least one lens unit, wherein at least one of the first lens unit and the second lens unit moves during zooming, and wherein at least one of the first lens unit, the second lens unit and the at least one lens unit of the lens component includes a layer made of a material having an Abbe number ($\nu IT$) and a partial dispersion ratio of g-spectral line and f-spectral line ($\theta IT$) that satisfies the following conditions:

$$11 < \nu IT < 27$$

$$0.2 < \theta IT < 0.4.$$

The layer has an optical power of a sign opposite to that of the lens unit including the layer.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE EMBODIMENTS

First of all, before describing embodiments of zoom lens systems of the present invention, a material used in each of the embodiments to perform chromatic aberration correction will be described below.

In each embodiment, a lens element or a layer formed of a high-dispersion solid material having a low partial dispersion ratio is provided in a lens unit that constitutes the zoom lens. In this configuration, the axial chromatic aberration and the chromatic aberration of magnification on the telephoto side are adequately corrected. For example, as the high-dispersion material having a low partial dispersion ratio, a material is used in which fine particles having an Abbe number vd of 15 or less (such as $TiO_2$ or ITO (indium tin oxide), especially, those having a particle diameter of ⅟20 or less of the wavelength of an incident ray) are mixed into a synthetic resin such as PMMA (polymethyl methacrylate).

The effect of the high-dispersion optical material such as ITO on the aberration correction for an optical system is described below.

ITO is different from an ordinary substance and exhibits conductivity due to a free carrier effecting the refractive index. The refractive index dispersion of ITO caused by the free carrier is added to the refractive index change of ITO in a short wavelength spectral region caused by a normal electron transition. For this reason, ITO has a wavelength dependency of an extremely large refractive index of Abbe number=5.53.

If such fine ITO particles are mixed with a synthetic resin such as PMMA to form a replica material of a lens or a layer formed on a lens surface, a refractive index property that is unachievable with an ordinary glass material or an ordinary replica material can be obtained.

For example, in cases where 20% fine ITO particles are mixed into PMMA, provided that Nd=1.56987, the following properties are obtained: vd (Abbe number)=13.27 and θgf (partial dispersion ratio)=0.289. Since TIH53 which is a normal glass having a large dispersion indicates vd=23.8 and θgf=0.62, the fine ITO particle mixed material seems to have quite a characteristic property. Especially, since θgf is a very small value, that material is extremely effective in improving chromatic aberration, in particular, a second-order spectrum. The extraordinary dispersion effect becomes larger as the mixture ratio of ITO is increased. However, in doing so, the transmittance is decreased. Therefore, the mixture ratio of ITO cannot be increased beyond a certain degree.

In the present invention, a material having such properties is appropriately used in a zoom lens to greatly improve chromatic aberration.

Exemplary embodiments of a zoom lens system of the present invention will now be described below.

FIGS. 1, 3, 5, 7 and 9 are cross-sectional diagrams of zoom lenses according to first to fifth embodiments of the present invention, respectively. The zoom lens according to each embodiment is used as a photographic optical system for video cameras or digital still cameras.

In the cross-sectional diagrams, reference character L1 denotes a first lens unit of positive refractive power (optical power=reciprocal of the focal length). Reference character L2 denotes a second lens unit of negative refractive power. Reference character L3 denotes a third lens unit of positive refractive power. Reference character L4 denotes a fourth lens unit of positive refractive power. Reference character SP denotes an aperture stop. Reference character G denotes a glass block designed to correspond to a parallel plate disposed inside an optical path, such as an optical low-pass filter, an infrared-cut filter, and a cover glass. Reference character IP denotes an image plane (field) on which a photosensitive surface of a solid-state imaging device (photoelectric converter), such as a CCD (charge-coupled device) sensor or a CMOS (complementary metal-oxide semiconductor) sensor is positioned.

During zooming from the wide-angle end to the telephoto end, as indicated by arrows shown in the cross-sectional diagrams, the first lens unit L1 moves to a position nearer to the object side at the telephoto end than at the wide-angle end, the second lens unit L2 moves to a position nearer to the image side at the telephoto end than at the wide-angle end, and the third lens unit L3 moves to a position nearer to the object side at the telephoto end than at the wide-angle end. Particularly, in each embodiment, the third lens unit L3 moves with a locus convex towards the object side so as to prevent an increase in the front lens diameter required for securing marginal rays at the middle zoom position, thus achieving a reduction in the front lens diameter. The aperture stop SP and the third lens unit L3 integrally move along the optical axis.

Moreover, the zoom ratio is increased while maintaining the total length of the zoom lens small, by moving the first lens unit L1 to a position nearer to the object side and moving the second lens unit L2 to a position nearer to the image side at the telephoto end than at the wide-angle end. Further, according to each embodiment, both of the first lens unit L1 and the second lens unit L2 are moved during zooming. However, the present invention is also applicable to a zooming type in which either one of the two lens units is moved. For example, during zooming, the second lens unit moves, while the first lens unit remains stationary.

Moreover, the rear-focusing method in which the fourth lens unit L4 is moved along the optical axis for focusing is employed. The solid line curve 4a and the chain line curve 4b of the fourth lens units L4 shown in the cross-sectional diagrams indicate the movement loci for correcting the field change caused by the zooming from the wide-angle end to the telephoto end at the time of focusing on an infinitely distant object and a closest object, respectively. This rear-focusing method effectively gives the advantage of reducing the total length of the zoom lens, while effectively utilizing a space between the third lens unit L3 and the fourth lens unit L4 by moving the fourth lens unit L4 with a locus convex towards the object side. This arrangement prevents an increase of the load on an actuator by using the fourth lens unit L4, which has a relatively small diameter, for focusing, thus facilitating high-speed focusing.

According to each embodiment, for example, when focusing from an infinitely distant object to a closest object is performed at the telephoto end, the fourth lens unit L4 is moved forward as indicated by a solid line 4c shown in the cross-sectional diagrams.

The first lens unit L1 includes, in order of the object side to the image side, a negative lens G11 of meniscus form having a concave surface facing the image side, a positive lens G12 having a convex surface facing the object side which is stronger in refractive power than a surface facing the image side, and a positive convex lens G13 having a convex surface facing the object side. With the first lens unit L1 configured accordingly, a zoom lens which is compact and small in diameter with less constituent lens elements and has excellent optical performance can be implemented.

The second lens unit L2 includes, in order of the object side to the image side, a negative lens G21 of meniscus form having a concave surface facing the image side, a negative lens G22, and a positive lens G23. With the second lens unit L2 configured accordingly, a zoom lens which is compact and small in diameter with less constituent lens elements and has excellent optical performance can be implemented.

The third lens unit L3 includes, in order of the object side to the image side, a positive lens G31, a negative lens G32 of meniscus form having a concave surface facing the image side, and a positive lens G33.

According to the first to fourth embodiments, the axial chromatic aberration and the chromatic aberration of magnification are adequately corrected especially at the telephoto end at the wavelength ranging from 420 nm to 650 nm by providing to a lens surface facing the image side of the positive lens G12 of the first lens unit L1, a replica layer G1$a$ of negative refractive power that is made of a fine particle mixed material that satisfies the following conditions:

$$11 < \nu IT < 27 \tag{1}$$

$$0.2 < \theta IT < 0.4 \tag{2}$$

where $\nu IT$ denotes the Abbe number of the replica layer G1$a$ that is made of the fine particle mixed material, and $\theta IT$ denotes a partial dispersion ratio for the g-spectral line and f-spectral line of the replica layer G1$a$, which is defined as:

$$\theta IT = (ng - nF)/(nF - nC)$$

where ng, nF, and nC are the refractive indices for the g-spectral line, F-spectral line and C-spectral line, respectively.

If the Abbe number of the fine particle mixed material decreases beyond the lower limit of the condition (1), it becomes necessary to increase the mixture ratio of ITO. This causes the deterioration of the transmission factor of the lens, and an excessive correction of the chromatic aberration occurs due to the increased extraordinary dispersion effects. On the other hand, if the upper limit of the condition (1) is exceeded, the chromatic aberration correction becomes insufficient.

Moreover, if the partial dispersion ratio decreases beyond the lower limit of the condition (2), it also becomes necessary to increase the mixture ratio of ITO. This causes the deterioration of the transmission factor of the lens, and an excessive correction of the chromatic aberration occurs. Moreover, if the partial dispersion ratio increases beyond the upper limit of the condition (2), the chromatic aberration correction effect becomes insufficient.

In order to satisfy both the transmission factor and chromatic aberration correction condition, the following conditions (1a) and (2a) are set:

$$13.0 < \nu IT < 24.5 \tag{1a}$$

$$0.26 < \theta IT < 0.36 \tag{2a}$$

Moreover, in the case of providing the extraordinary dispersion layer G1$a$ to the first lens unit L1 as in the first to fourth embodiments, the following condition is satisfied:

$$5 < |f1a/f1| < 60 \tag{3}$$

where f1$a$ is a focal length of the layer G1$a$, and f1 is a focal length of the first lens unit L1.

If the refractive power of the layer G1$a$ is excessively intensified beyond the lower limit of the condition (3), an excessive second-order spectrum correction of the axial chromatic aberration occurs at the telephoto end. On the other hand, if the upper limit of the condition (3) is exceeded, the second-order spectrum correction effect of the axial chromatic aberration becomes insufficient.

In order to adequately correct the chromatic aberration, the following condition (3a) is set:

$$8 < |f1a/f1| < 48 \tag{3a}$$

Regardless of the availability of the layer G1$a$ in the first lens unit L1, in order to attain a zoom lens which is compact and small in the total system, the following condition is satisfied:

$$0.5 < f1/ft < 0.9 \tag{4}$$

where f1 is a focal length of the first lens unit L1, and ft is a focal length of the zoom lens at the telephoto end.

If the refractive power of the first lens unit L1 is excessively intensified beyond the lower limit of the condition (4), this is advantageous in terms of reducing the total length. However, a disadvantage such as field tilt caused by manufacturing errors and image blurring during zooming appear. Therefore, a highly precise lens barrel is required, which results in an increase in the manufacturing cost. On the other hand, if the upper limit of the condition (4) is exceeded, the amount of movement required by the first lens unit L1 or the second lens unit L2 for securing the desired zoom ratio increases disadvantageously, and the compactness of the zoom lens becomes insufficient.

In order to satisfy both the reduction in size and the high optical performance, the following condition (4a) is satisfied:

$$0.6 < f1/ft < 0.8 \tag{4a}$$

Furthermore, according to the first to fourth embodiments, the layer G1$a$ is provided at a surface facing the image side of the second positive lens G12 counting from the object side. However, the similar effect is obtained by providing the layer G1$a$ either at the image side surface or the object side surface of the third positive lens G13.

Figure 1:
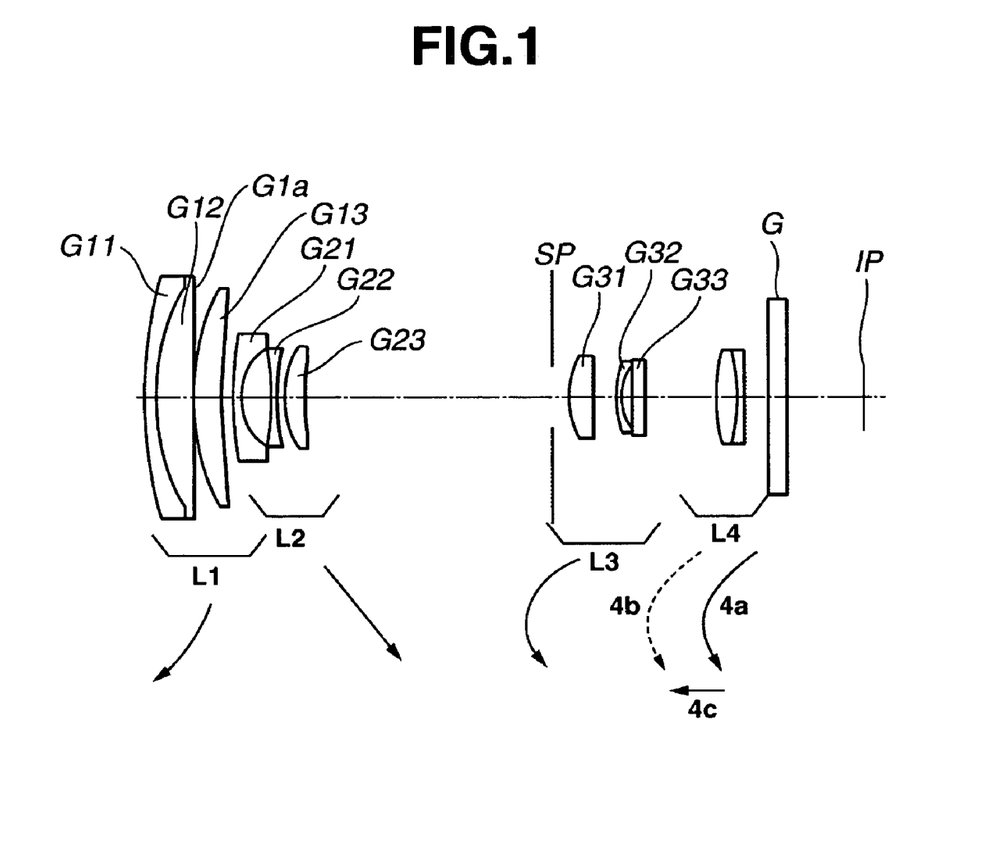
FIG. 1 is a cross-sectional diagram showing a zoom lens at the wide-angle end according to a first embodiment of the present invention.
Figure 2A:
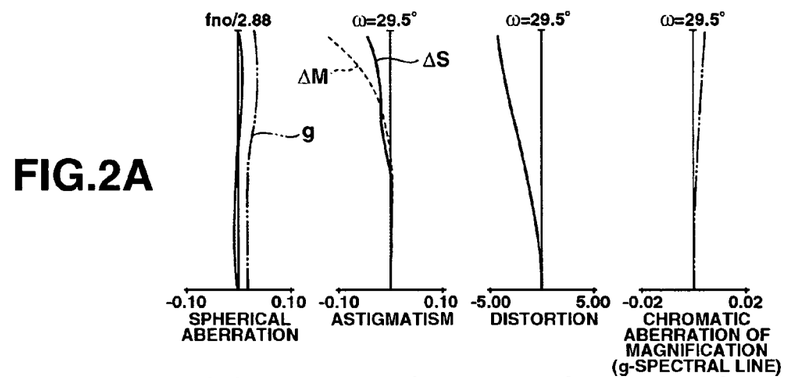
FIGS. 2A to 2C are graphs showing various aberration curves in the zoom lens according to the first embodiment of the present invention
Figure 2B:
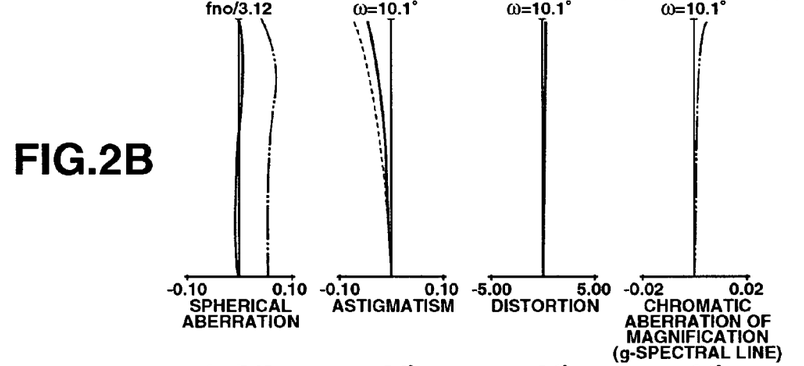
Figure 2C:
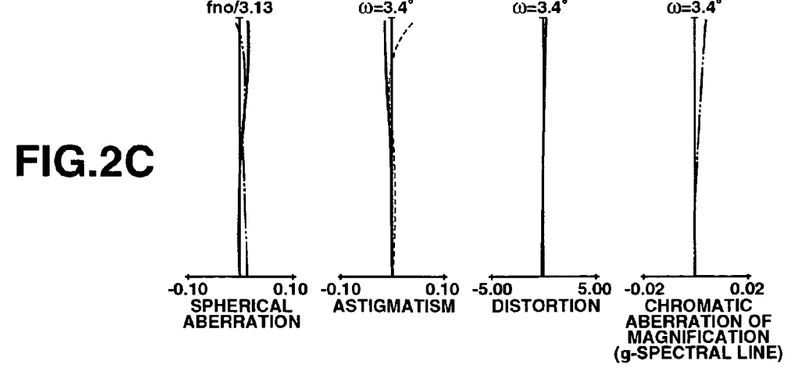
Figure 3:
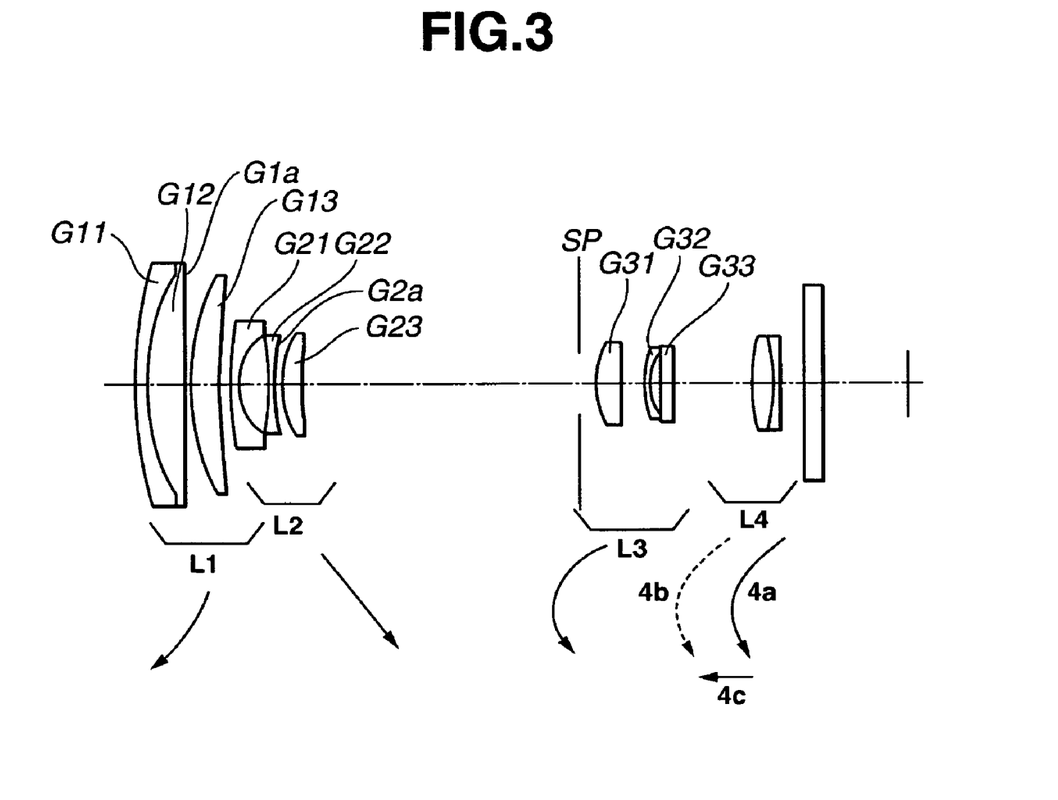
FIG. 3 is a cross-sectional diagram showing a zoom lens at the wide-angle end according to a second embodiment of the present invention.
Figure 4A:
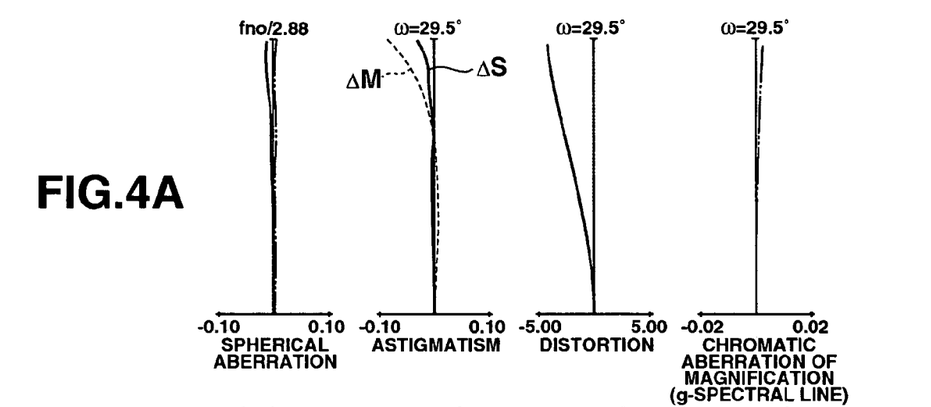
FIGS. 4A to 4C are graphs showing various aberration curves in the zoom lens according to the second embodiment of the present invention.
Figure 4B:
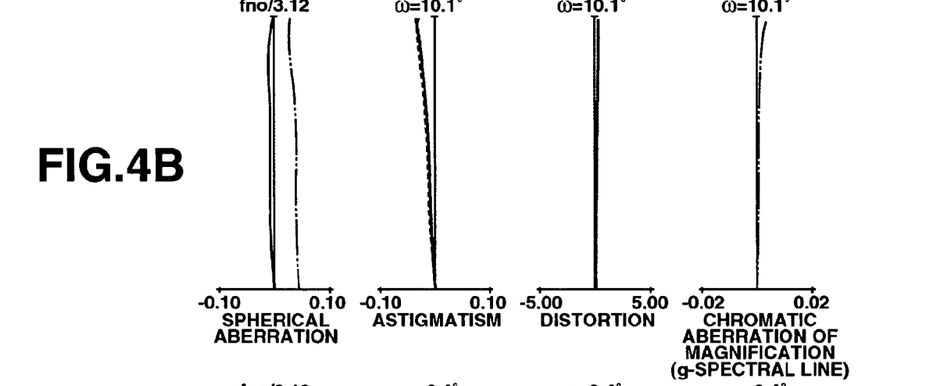
Figure 4C:
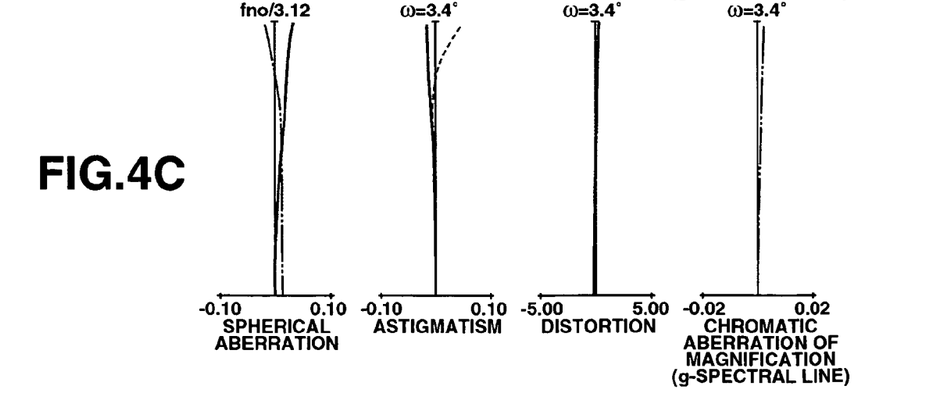
Figure 7:
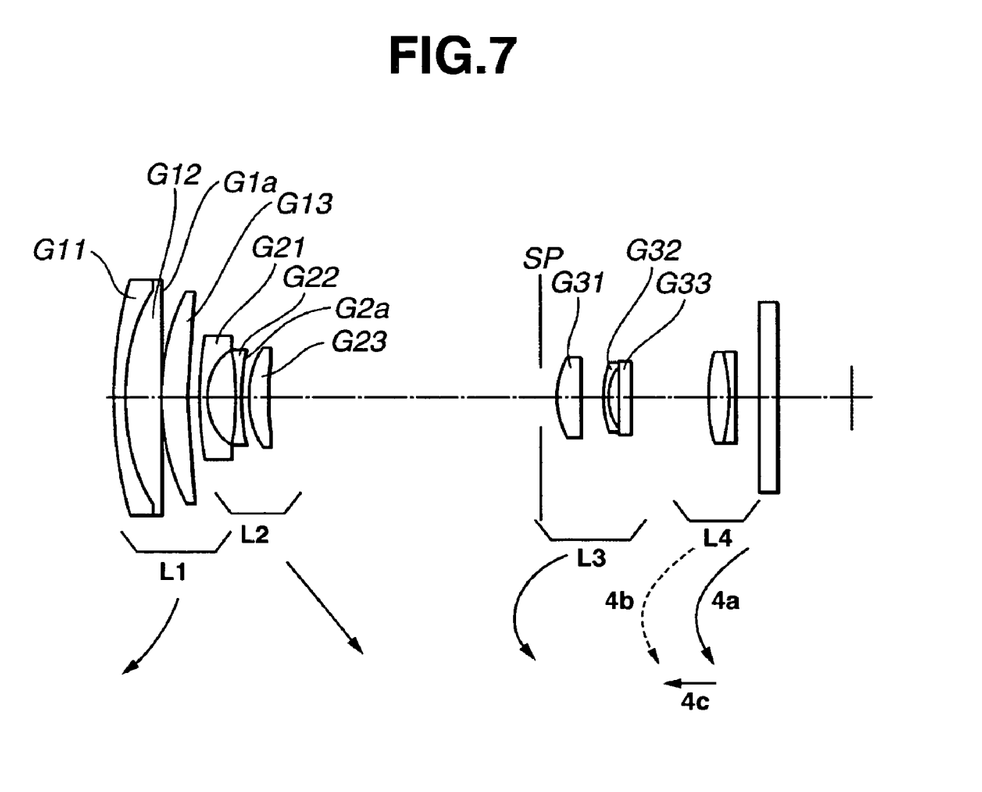
FIG. 7 is a cross-sectional diagram showing a zoom lens at the wide-angle end according to a fourth embodiment of the present invention.
Figure 8A:
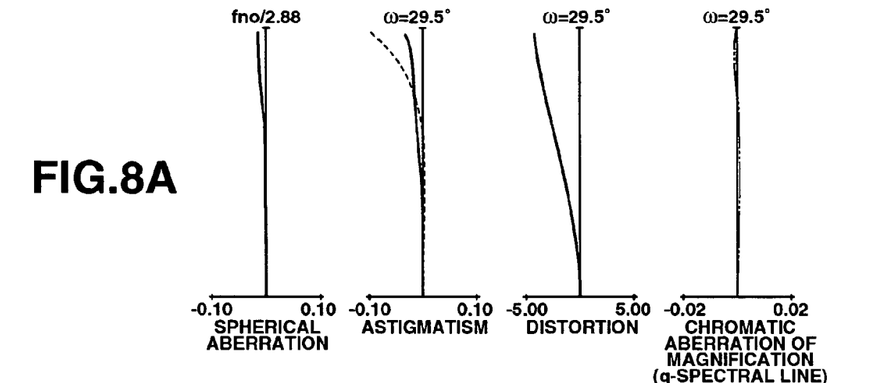
FIGS. 8A to 8C are graphs showing various aberration curves in the zoom lens according to the fourth embodiment of the present invention.
Figure 8B:
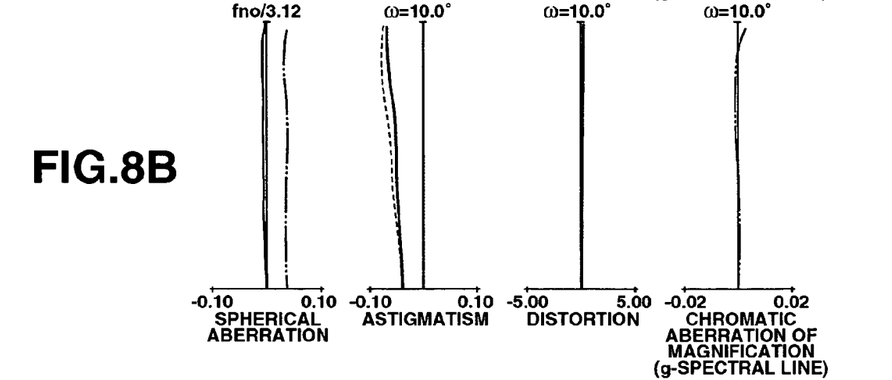
Figure 8C:
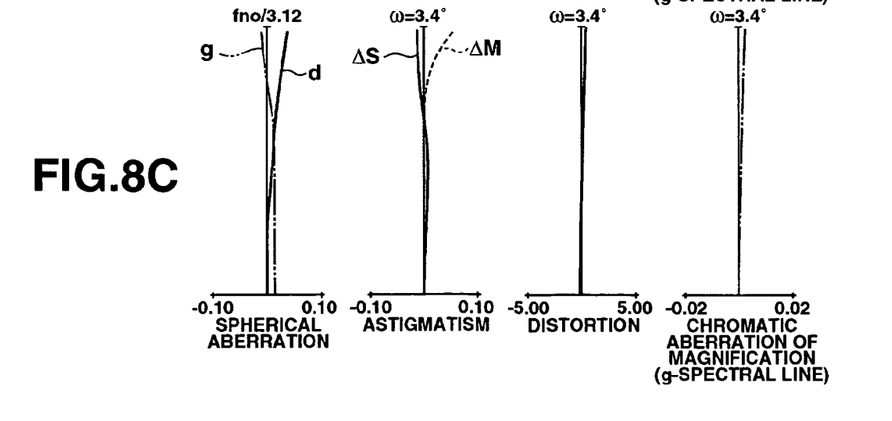

According to the second and fourth embodiments, a layer G2$a$ of positive refractive power that satisfies the conditions (1) and (2) is also provided to the second lens unit L2, in addition to the layer G1$a$ provided in the first lens unit L1. More specifically, the layer G2$a$ is provided on a lens surface facing the image side of the negative lens G22.

If the extraordinary dispersion effect of the first lens unit L1 increases in order to correct the second-order spectrum of the axial chromatic aberration or the chromatic aberration of magnification at the telephoto end, the second-order spectrum of the chromatic aberration of magnification deteriorates at the wide-angle end. In the second and fourth embodiments, by also providing to the second lens unit L2 the layer G2$a$ having the large extraordinary dispersion effect, the second-order spectrum of the chromatic aberration of magnification at the wide-angle end is corrected, and further improvements in the axial chromatic aberration and the chromatic aberration of magnification at the telephoto end are attained.

In the case of providing the extraordinary dispersion layer G2$a$ to the second lens unit L2, the following condition (5) is satisfied:

$$12 < |f2a/f2| < 20 \tag{5}$$

where f2a is a focal length of the layer G2a, and f2 is a focal length of the second lens unit L2.

If the refractive power of the layer G2a is excessively intensified beyond the lower limit of the condition (5), an excessive second-order spectrum correction of the chromatic aberration of magnification occurs at the wide-angle end. On the other hand, if the upper limit of the condition (5) is exceeded, the correction of the second-order spectrum of the chromatic aberration of magnification becomes insufficient.

Furthermore, regardless of the availability of the layer G2a in the second lens unit L2, in order to attain a zoom lens which is compact and small in total length while maintaining high optical performance, the following condition (6) is satisfied:

$$0.10 < |f2/ft| < 0.20 \quad (6)$$

If the refractive power of the second lens unit L2 is intensified beyond the lower limit of the condition (6), the amount of movement of the second lens unit L2 during zooming is reduced. However, the Petzval sum increases in the negative direction in whole, so that it becomes difficult to correct a field curvature. On the other hand, if the upper limit of the condition (6) is exceeded, the amount of movement of the second lens unit L2 for zooming becomes large. This is disadvantageous in compactness of the zoom lens.

Further, in order to satisfy both the reduction in size and the high optical performance, the following condition (6a) is satisfied:

$$0.13 < |f2/ft| < 0.17 \quad (6a)$$

Further, in the second and fourth embodiments, the layer G2a is provided at a lens surface facing the image side of the negative lens G22. However, the layer G2a of positive refractive power may also be provided on a lens surface of the negative lens G21 or the positive lens G23.

Figure 5:
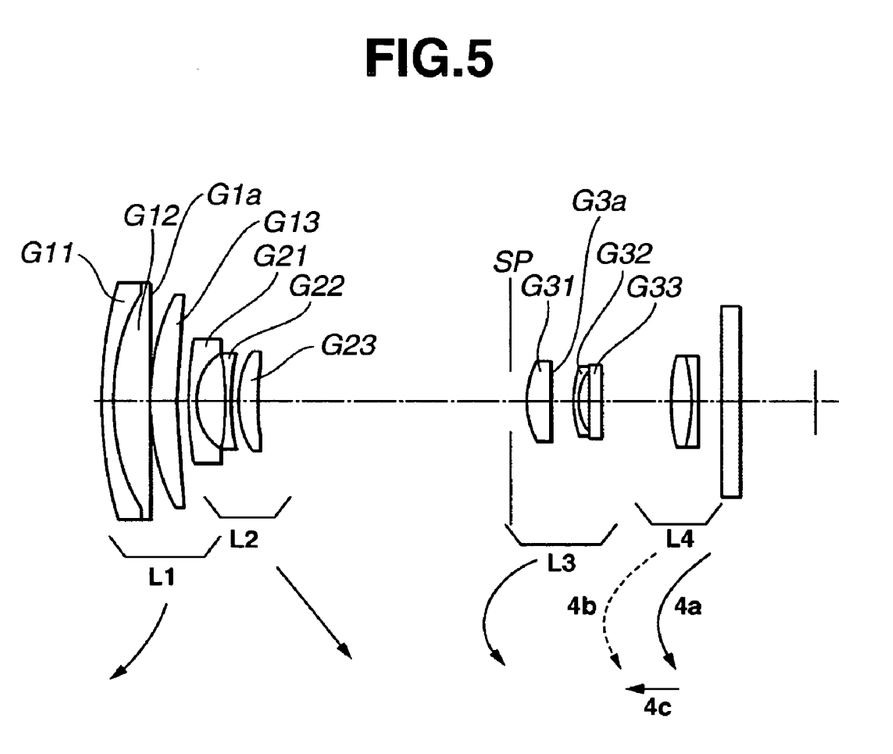
FIG. 5 is a cross-sectional diagram showing a zoom lens at the wide-angle end according to a third embodiment of the present invention.
Figure 6A:
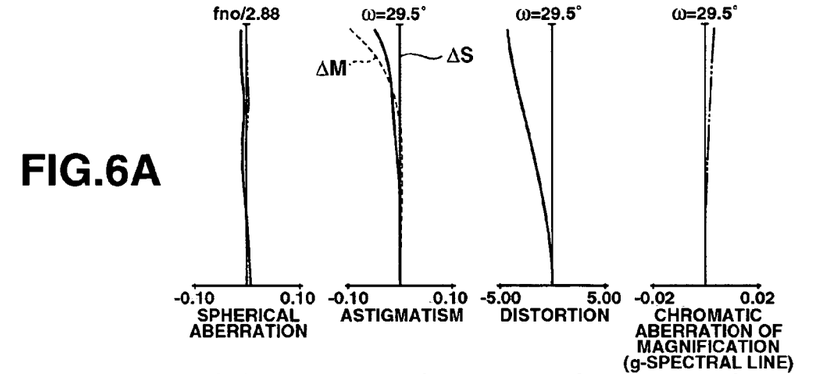
FIGS. 6A to 6C are graphs showing various aberration curves in the zoom lens according to the third embodiment of the present invention.
Figure 6B:
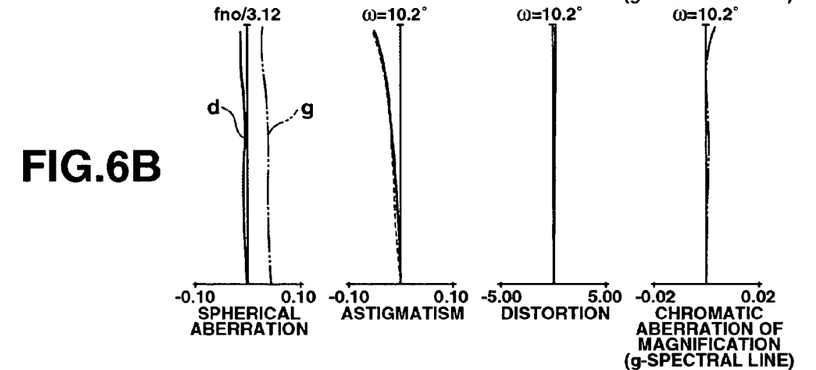
Figure 6C:
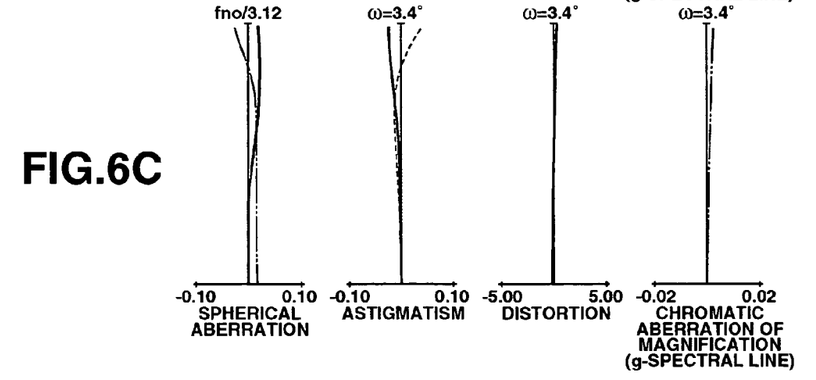
Figure 9:
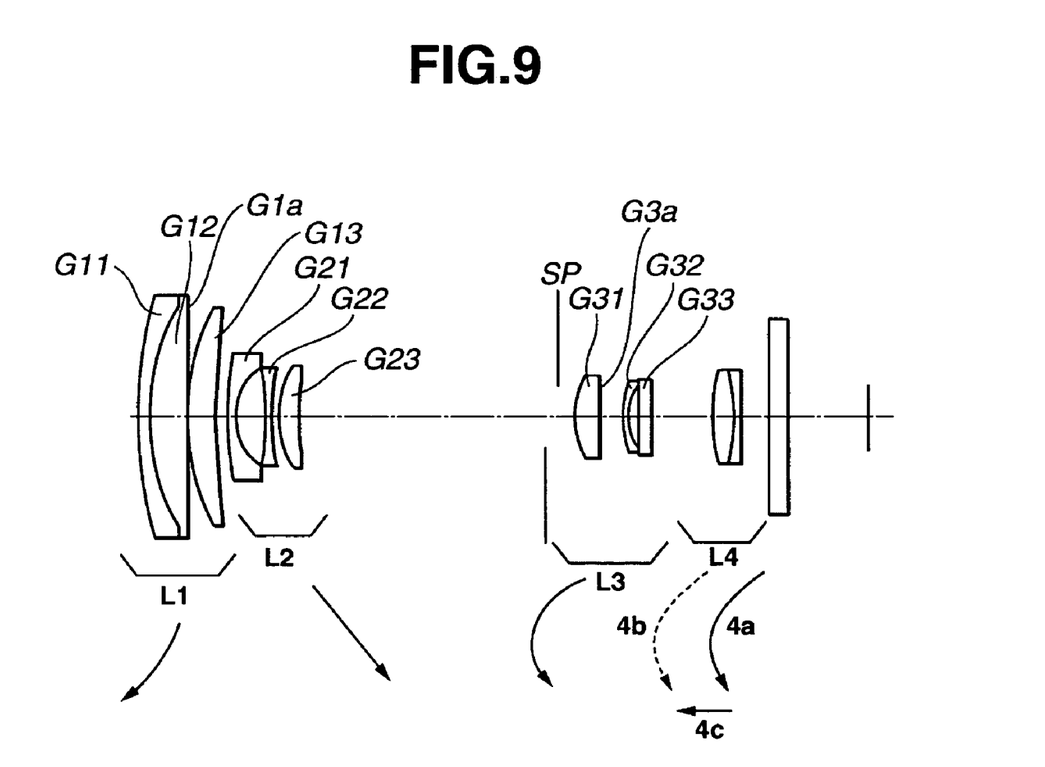
FIG. 9 is a cross-sectional diagram showing a zoom lens at the wide-angle end according to a fifth embodiment of the present invention.
Figure 10A:
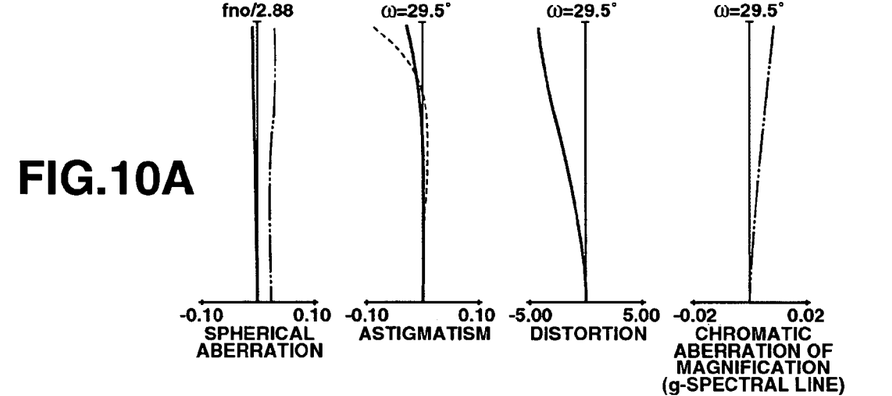
FIGS. 10A to 10C are graphs showing various aberration curves in the zoom lens according to the fifth embodiment of the present invention.
Figure 10B:
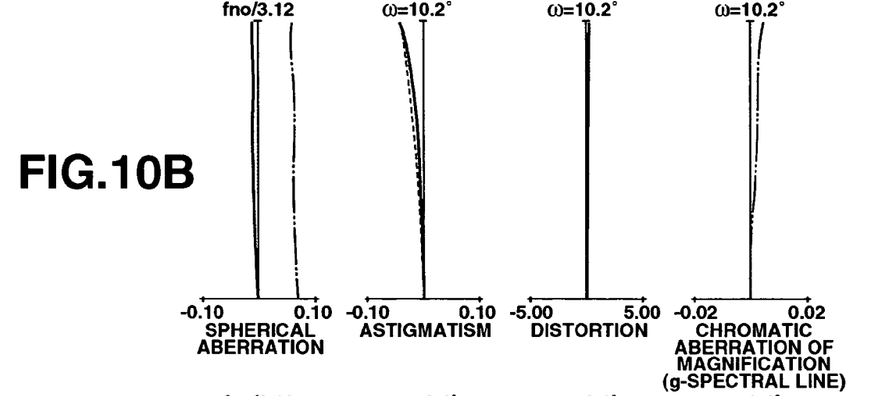
Figure 10C:
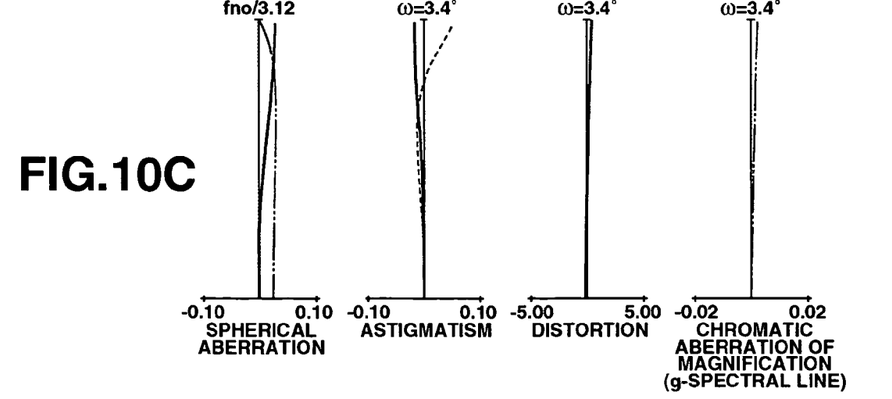

In the third embodiment, in addition to the first lens unit L1, the third lens unit L3 also has a layer G3a of negative refractive power having the extraordinary dispersion effect that satisfies the conditions (1) and (2). In the fifth embodiment, only the third lens unit L3 has the layer G3 a of negative refractive power. More specifically, the layer G3a is provided on a lens surface facing the image side of the positive lens G31. According to the third and fifth embodiments, the extraordinary dispersion effect of the third lens unit L3 improves the axial chromatic aberration at the telephoto end.

In the case of providing the extraordinary dispersion layer G3a to the third lens unit L3, the following condition (7) is satisfied:

$$6.0 < |f3a/f3| < 30 \quad (7)$$

where f3a denotes a focal length of the layer G3a, and f3 denotes a focal length of the third lens unit L3.

If the refractive power of the layer G3a is excessively intensified beyond the lower limit of the condition (7), the second-order spectrum of the axial chromatic aberration deteriorates at the wide-angle end. On the other hand, if the upper limit of the condition (7) is exceeded, the correction of the second-order spectrum of the axial chromatic aberration becomes insufficient at the telephoto end.

Furthermore, in order to correct the chromatic aberration, the following condition (7a) is set:

$$8.0 < |f3a/f3| < 23 \quad (7a)$$

Regardless of the availability of the layer G3a in the third lens unit L3, in order to attain a compact zoom lens, the following condition (8) is satisfied:

$$0.3 < f3/ft < 0.45 \quad (8)$$

If the focal length of the third lens unit L3 becomes small beyond the lower limit of the condition (8), the Petzval sum excessively increases in the positive direction, so that it becomes difficult to correct the field curvature. On the other hand, if the upper limit of the condition (8) is exceeded, the third lens unit L3 contributes less to the zooming, and the amounts of movement of the first lens unit L1 and the second lens unit L2 required for obtaining the desired zoom ratio become large. This is disadvantageous in compactness of the zoom lens.

Furthermore, in the first to fifth embodiments, the layer made of the material that satisfies the conditions (1) and (2) is a spherical surface. However, an aspherical surface can be applied to the layer to further correct various aberrations such as astigmatism and distortion.

Numerical data of numerical examples 1 to 5 corresponding to the first to fifth embodiments of the present invention are shown below. In the numerical examples 1 to 5, f denotes a focal length, Fno denotes the F-number, and ω denotes a semifield angle. Reference character i denotes the order counting from the object side, reference character Ri denotes the radius of curvature of the i-th surface, reference character Di denotes the axial separation between the i-th surface and the (i+1)th surface, reference character Ni and νi respectively denote the refractive index and Abbe number, relative to d-spectral line, of the i-th material. However, the replica layer that satisfies the conditions (1) and (2) is indicated separately as Nja, νja (where j=1 to 3, the j-th lens unit).

The shape of an aspherical surface is expressed in the coordinates with an X axis in the optical axis direction and an h axis in the direction perpendicular to the optical axis, the direction in which light advances being taken as positive, by the following equation:

$$X = \frac{(1/R)h^2}{1 + \sqrt{\{1-(1+k)(h/R)^2\}}} + Bh^4 + Ch^6 + Dh^8 + Eh^{10} + A'h^3 + B'h^5 + C'h^7$$

where R is a paraxial radius of curvature, k is a conic constant, and B, C, D, E, A', B' and C' are aspheric coefficients.

Table 1 shows a relationship between the numerical examples and the above-described conditions.

| Numerical Example 1 | | | |
|---|---|---|---|
| f = 5.88~56.58 | Fno = 2.88~3.13 | 2ω = 58.9°~6.7° | |
| R1 = 48.050 | D1 = 1.20 | N1 = 1.846660 | ν1 = 23.9 |
| R2 = 26.647 | D2 = 3.90 | N2 = 1.487490 | ν2 = 70.2 |
| R3 = −262.043 | D3 = 0.05 | N1a = 1.569872 | ν1a = 13.3 |
| R4 = −367.789 | D4 = 0.20 | | |
| R5 = 25.065 | D5 = 2.70 | N3 = 1.772499 | ν3 = 49.6 |
| R6 = 80.024 | D6 = Variable | | |
| R7 = 46.572 | D7 = 0.70 | N4 = 1.834807 | ν4 = 42.7 |
| R8 = 6.684 | D8 = 3.05 | | |
| R9 = −24.852 | D9 = 0.60 | N5 = 1.772499 | ν5 = 49.6 |
| R10 = 24.852 | D10 = 0.75 | | |
| R11 = 14.441 | D11 = 1.80 | N6 = 1.922860 | ν6 = 18.9 |

-continued

Numerical Example 1

| | | | |
|---|---|---|---|
| R12 = 54.421 | D12 = Variable | | |
| R13 = Stop | D13 = 1.40 | | |
| R14 = 9.302 | D14 = 2.60 | N7 = 1.583126 | ν7 = 59.4 |
| R15 = 377.119 | D15 = 2.16 | | |
| R16 = 14.297 | D16 = 0.60 | N8 = 1.846660 | ν8 = 23.9 |
| R17 = 8.254 | D17 = 0.82 | | |
| R18 = 36.248 | D18 = 1.40 | N9 = 1.487490 | ν9 = 70.2 |
| R19 = −44.446 | D19 = 1.11 | | |
| R20 = ∞ | D20 = Variable | | |
| R21 = 18.115 | D21 = 2.30 | N10 = 1.696797 | ν10 = 55.5 |
| R22 = −18.115 | D22 = 0.60 | N11 = 1.846660 | ν11 = 23.9 |
| R23 = −70.118 | D23 = 2.20 | | |
| R24 = ∞ | D24 = 2.20 | N12 = 1.516330 | ν12 = 64.1 |
| R25 = ∞ | | | |

| | Focal length | | |
|---|---|---|---|
| Variable separation | 5.88 | 28.92 | 56.58 |
| D6 | 0.80 | 17.57 | 22.77 |
| D12 | 24.80 | 5.81 | 2.00 |
| D20 | 5.72 | 4.44 | 9.03 |

Aspheric surface coefficients

R14 k = 3.18048e−01 B = −4.03867e−05 C = 1.47963e−05
D = −9.12017e−08 E = 1.49211e−09
A' = −8.96331e−5 B' = −7.24669e−5 C' = −1.06688e−6

Numerical Example 2 f = 5.88~56.58    Fno = 2.88~3.12    2ω = 58.9°~6.7°

| | | | |
|---|---|---|---|
| R1 = 46.879 | D1 = 1.20 | N1 = 1.846660 | ν1 = 23.9 |
| R2 = 27.037 | D2 = 3.90 | N2 = 1.487490 | ν2 = 70.2 |
| R3 = −201.382 | D3 = 0.05 | N1a = 1.569872 | ν1a = 13.3 |
| R4 = −387.115 | D4 = 0.20 | | |
| R5 = 25.348 | D5 = 2.70 | N3 = 1.772499 | ν3 = 49.6 |
| R6 = 78.149 | D6 = Variable | | |
| R7 = 45.184 | D7 = 0.70 | N4 = 1.834807 | ν4 = 42.7 |
| R8 = 6.666 | D8 = 3.07 | | |
| R9 = −23.096 | D9 = 0.60 | N5 = 1.772499 | ν5 = 49.6 |
| R10 = 23.096 | D10 = 0.05 | N2a = 1.530189 | ν2a = 24.1 |
| R11 = 32.958 | D11 = 0.70 | | |
| R12 = 15.004 | D12 = 1.80 | N6 = 1.922860 | ν6 = 18.9 |
| R13 = 56.593 | D13 = Variable | | |
| R14 = Stop | D14 = 1.40 | | |
| R15 = 9.215 | D15 = 2.60 | N7 = 1.583126 | ν7 = 59.4 |
| R16 = −4250.027 | D16 = 2.16 | | |
| R17 = 14.073 | D17 = 0.60 | N8 = 1.846660 | ν8 = 23.9 |
| R18 = 8.060 | D18 = 0.82 | | |
| R19 = 30.141 | D19 = 1.40 | N9 = 1.487490 | ν9 = 70.2 |
| R20 = −50.234 | D20 = 1.11 | | |
| R21 = ∞ | D21 = Variable | | |
| R22 = 18.116 | D22 = 2.30 | N10 = 1.696797 | ν10 = 55.5 |
| R23 = −19.993 | D23 = 0.60 | N11 = 1.846660 | ν11 = 23.9 |
| R24 = −88.468 | D24 = 2.20 | | |
| R25 = ∞ | D25 = 2.20 | N12 = 1.516330 | ν12 = 64.1 |
| R26 = ∞ | | | |

| | Focal length | | |
|---|---|---|---|
| Variable separation | 5.88 | 28.88 | 56.58 |
| D6 | 0.80 | 17.56 | 22.79 |
| D13 | 24.68 | 5.78 | 1.99 |
| D21 | 5.53 | 4.27 | 9.03 |

Aspheric surface coefficients

R15 k = 3.69419e−01 B = −5.66270e−05 C = 1.49315e−05
D = −9.82351e−08 E = 4.33129e−11
A' = −8.96331e−5 B' = −7.26737e−5 C' = −1.01524e−6

Numerical Example 3 f = 5.88~56.58    Fno = 2.88~3.12    2ω = 58.9°~6.7°

| | | | |
|---|---|---|---|
| R1 = 49.604 | D1 = 1.20 | N1 = 1.846660 | ν1 = 23.9 |
| R2 = 28.231 | D2 = 3.90 | N2 = 1.487490 | ν2 = 70.2 |
| R3 = −289.121 | D3 = 0.05 | N1a = 1.538207 | ν1a = 21.1 |
| R4 = −699.944 | D4 = 0.20 | | |
| R5 = 26.806 | D5 = 2.70 | N3 = 1.772499 | ν3 = 49.6 |
| R6 = 82.319 | D6 = Variable | | |
| R7 = 41.330 | D7 = 0.70 | N4 = 1.834000 | ν4 = 37.2 |
| R8 = 6.915 | D8 = 3.18 | | |
| R9 = −24.019 | D9 = 0.60 | N5 = 1.772499 | ν5 = 49.6 |
| R10 = 24.019 | D10 = 0.75 | | |
| R11 = 15.542 | D11 = 1.80 | N6 = 1.922860 | ν6 = 18.9 |
| R12 = 100.016 | D12 = Variable | | |
| R13 = Stop | D13 = 1.40 | | |
| R14 = 9.471 | D14 = 2.60 | N7 = 1.583126 | ν7 = 59.4 |
| R15 = −67.835 | D15 = 0.05 | N3a = 1.569872 | ν3a = 13.3 |
| R16 = −93.456 | D16 = 2.11 | | |
| R17 = 15.304 | D17 = 0.60 | N8 = 1.761821 | ν8 = 26.5 |
| R18 = 8.013 | D18 = 0.82 | | |
| R19 = 40.743 | D19 = 1.40 | N9 = 1.487490 | ν9 = 70.2 |
| R20 = −110.416 | D20 = 1.11 | | |
| R21 = ∞ | D21 = Variable | | |
| R22 = 18.672 | D22 = 2.30 | N10 = 1.696797 | ν10 = 55.5 |
| R23 = −14.792 | D23 = 0.60 | N11 = 1.846660 | ν11 = 23.9 |
| R24 = −47.673 | D24 = 2.20 | | |
| R25 = ∞ | D25 = 2.20 | N12 = 1.516330 | ν12 = 64.1 |
| R26 = ∞ | | | |

| | Focal length | | |
|---|---|---|---|
| Variable separation | 5.88 | 28.59 | 56.58 |
| D6 | 0.80 | 19.21 | 25.06 |
| D12 | 26.18 | 6.06 | 1.92 |
| D21 | 5.42 | 4.45 | 8.63 |

Aspheric surface coefficients

R14 k = 1.47049e−01 B = −3.16092e−05 C = 3.00972e−05
D = 5.94624e−07 E = −4.75973e−09
A' = −6.69157e−5 B' = −8.82016e−5 C' = −6.08389e−6

Numerical Example 4 f = 5.88~56.58    Fno = 2.88~3.12    2ω = 58.9°~6.7°

| | | | |
|---|---|---|---|
| R1 = 44.913 | D1 = 1.20 | N1 = 1.846660 | ν1 = 23.9 |
| R2 = 26.846 | D2 = 3.90 | N2 = 1.487490 | ν2 = 70.2 |
| R3 = −126.047 | D3 = 0.05 | N1a = 1.550157 | ν1a = 18.0 |
| R4 = −331.684 | D4 = 0.20 | | |
| R5 = 25.161 | D5 = 2.70 | N3 = 1.772499 | ν3 = 49.6 |
| R6 = 75.792 | D6 = Variable | | |
| R7 = 47.345 | D7 = 0.70 | N4 = 1.834807 | ν4 = 42.7 |
| R8 = 6.589 | D8 = 3.11 | | |
| R9 = −22.944 | D9 = 0.60 | N5 = 1.772499 | ν5 = 49.6 |
| R10 = 22.944 | D10 = 0.05 | N2a = 1.569872 | ν2a = 13.3 |
| R11 = 35.554 | D11 = 0.70 | | |
| R12 = 14.616 | D12 = 1.80 | N6 = 1.922860 | ν6 = 18.9 |
| R13 = 44.280 | D13 = Variable | | |
| R14 = stop | D14 = 1.40 | | |
| R15 = 8.911 | D15 = 2.60 | N7 = 1.583126 | ν7 = 59.4 |
| R16 = 101.425 | D16 = 2.16 | | |
| R17 = 13.757 | D17 = 0.60 | N8 = 1.846660 | ν8 = 23.9 |
| R18 = 8.020 | D18 = 0.82 | | |
| R19 = 29.055 | D19 = 1.40 | N9 = 1.487490 | ν9 = 70.2 |
| R20 = −35.086 | D20 = 1.11 | | |
| R21 = ∞ | D21 = Variable | | |
| R22 = 17.511 | D22 = 2.30 | N10 = 1.696797 | ν10 = 55.5 |
| R23 = −24.472 | D23 = 0.60 | N11 = 1.846660 | ν11 = 23.9 |

-continued

Numerical Example 4

| R24 = −216.317 | D24 = 2.20 | | |
|---|---|---|---|
| R25 = ∞ | D25 = 2.20 | N12 = 1.516330 | ν12 = 64.1 |
| R26 = ∞ | | | |

| | Focal length | | |
|---|---|---|---|
| Variable separation | 5.88 | 29.30 | 56.58 |
| D6 | 0.80 | 17.00 | 22.03 |
| D13 | 24.20 | 5.70 | 2.03 |
| D21 | 5.51 | 3.73 | 8.53 |

Aspheric surface coefficients

R15 k = 4.30832e−1  B = −8.05041e−5  C = 1.57488e−5
D = −9.21392e−8  E = 1.09926e−9
A' = −8.96331e−5  B' = −7.16067e−5  C' = −1.44172e−6

Numerical Example 5 f = 5.88~56.58    Fno = 2.88~3.12    2ω = 58.9°~6.7°

| R1 = 47.681 | D1 = 1.20 | N1 = 1.846660 | ν1 = 23.9 |
|---|---|---|---|
| R2 = 26.891 | D2 = 3.95 | N2 = 1.496999 | ν2 = 81.5 |
| R3 = −766.260 | D3 = 0.20 | | |
| R4 = 25.915 | D4 = 2.70 | N3 = 1.772499 | ν3 = 49.6 |
| R5 = 83.983 | D5 = Variable | | |
| R6 = 45.600 | D6 = 0.70 | N4 = 1.834807 | ν4 = 42.7 |
| R7 = 6.815 | D7 = 3.17 | | |
| R8 = −24.232 | D8 = 0.60 | N5 = 1.772499 | ν5 = 49.6 |
| R9 = 24.232 | D9 = 0.75 | | |
| R10 = 15.143 | D10 = 1.80 | N6 = 1.922860 | ν6 = 18.9 |
| R11 = 71.565 | D11 = Variable | | |
| R12 = Stop | D12 = 1.40 | | |
| R13 = 9.278 | D13 = 2.60 | N7 = 1.583126 | ν7 = 59.4 |
| R14 = −99.284 | D14 = 0.05 | N3a = 1.550157 | ν3a = 18.0 |
| R15 = −2692.790 | D15 = 2.11 | | |
| R16 = 15.156 | D16 = 0.60 | N8 = 1.761821 | ν8 = 26.5 |
| R17 = 8.095 | D17 = 0.82 | | |
| R18 = 42.191 | D18 = 1.40 | N9 = 1.487490 | ν9 = 70.2 |
| R19 = −47.194 | D19 = 1.11 | | |
| R20 = ∞ | D20 = Variable | | |
| R21 = 18.193 | D21 = 2.30 | N10 = 1.696797 | ν10 = 55.5 |
| R22 = −16.121 | D22 = 0.60 | N11 = 1.846660 | ν11 = 23.9 |
| R23 = −58.223 | D23 = 2.20 | | |
| R24 = ∞ | D24 = 2.20 | N12 = 1.516330 | ν12 = 64.1 |
| R25 = ∞ | | | |

| | Focal length | | |
|---|---|---|---|
| Variable separation | 5.88 | 28.64 | 56.58 |
| D5 | 0.80 | 17.93 | 23.34 |
| D11 | 24.85 | 5.78 | 1.94 |
| D20 | 5.46 | 4.42 | 8.97 |

Aspheric surface coefficients

R13 k = 1.27729e−01  B = −1.93034e−5  C = 3.49147e−5
D = 5.90236e−7  E = −2.90135e−9
A' = −6.69157e−5  B' = −9.70651e−5  C' = −6.90167e−6

TABLE I

| | Numerical Example | | | | |
|---|---|---|---|---|---|
| | 1 | 2 | 3 | 4 | 5 |
| νIT(G1a) | 13.3 | 13.3 | 21.1 | 18.0 | — |
| θIT(G1a) | 0.289 | 0.289 | 0.333 | 0.326 | — |
| νIT(G2a) | — | 24.1 | — | 13.3 | — |

TABLE I-continued

| | Numerical Example | | | | |
|---|---|---|---|---|---|
| | 1 | 2 | 3 | 4 | 5 |
| θIT(G2a) | — | 0.340 | — | 0.289 | — |
| νIT(G3a) | — | — | 13.3 | — | 18.0 |
| θIT(G3a) | — | — | 0.289 | — | 0.326 |
| Condition (3) | 42.686 | 19.565 | 22.433 | 10.074 | — |
| Condition (4) | 0.662 | 0.665 | 0.721 | 0.648 | 0.677 |
| Condition (5) | — | 17.417 | — | 14.169 | — |
| Condition (6) | 0.147 | 0.147 | 0.159 | 0.141 | 0.150 |
| Condition (7) | — | — | 20.647 | — | 9.017 |
| Condition (8) | 0.365 | 0.349 | 0.372 | 0.344 | 0.367 |

Embodiments of optical apparatuses using the zoom lenses of the first to fifth embodiments as a photographic optical system are described below with reference to FIGS. 11 and 12.

Figure 11:
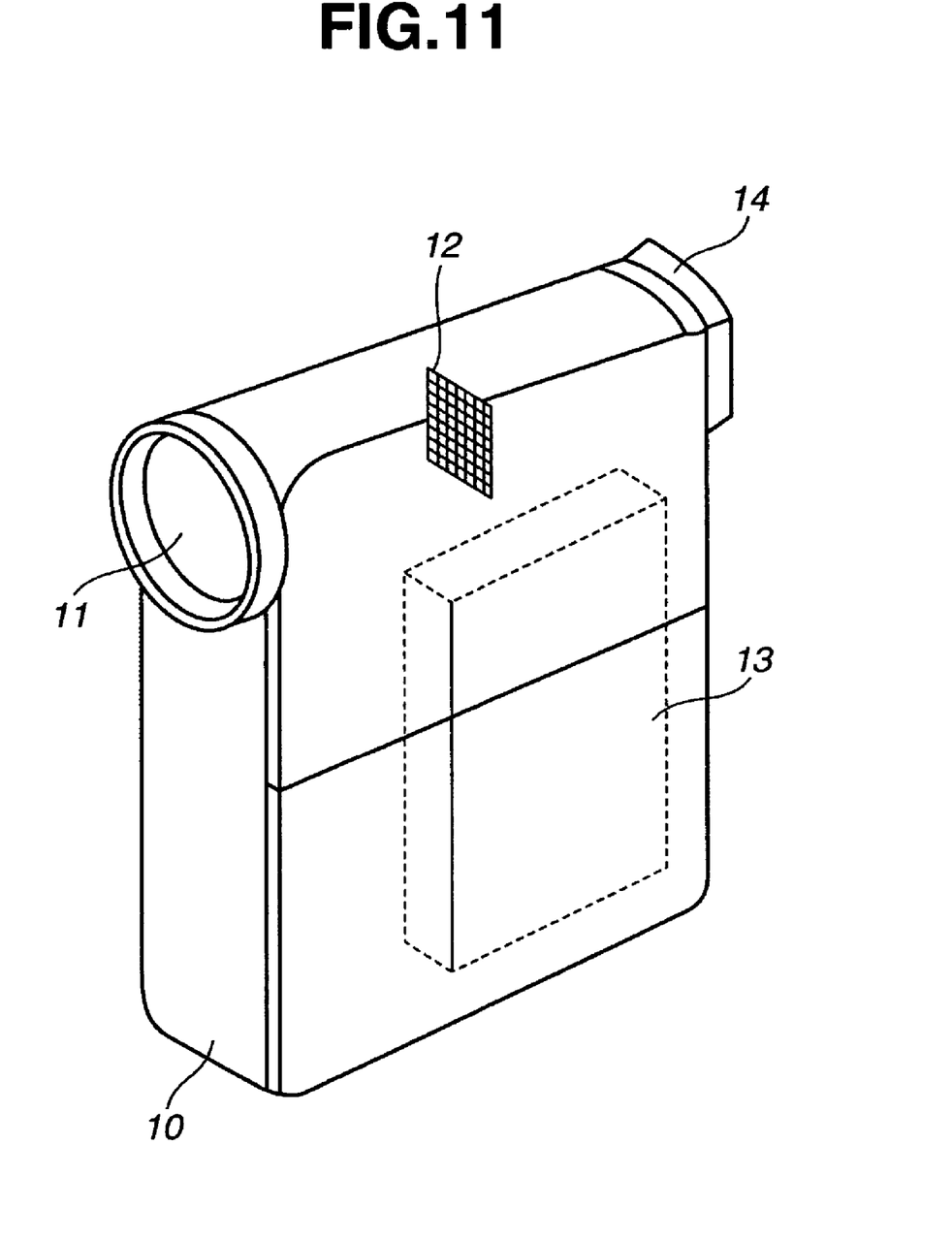
FIG. 11 is a schematic diagram showing a video camera.

FIG. 11 is a schematic diagram showing a video camera in which a zoom lens according to the present invention is used. Referring to FIG. 11, the video camera includes a video camera body 10, a photographic optical system 11 composed of a zoom lens according to one of the first to fifth embodiments, a solid-state imaging device 12 (photoelectric converter), such as a CCD sensor or a CMOS sensor, arranged to receive an object image formed by the photographic optical system 11, a memory 13 for recording the object image received by the solid-state imaging device 12, and a finder 14 used for observing the object image. Examples of the finder 14 include an optical finder, a liquid crystal display panel that displays the object image on a display element, and the like.

Figure 12:
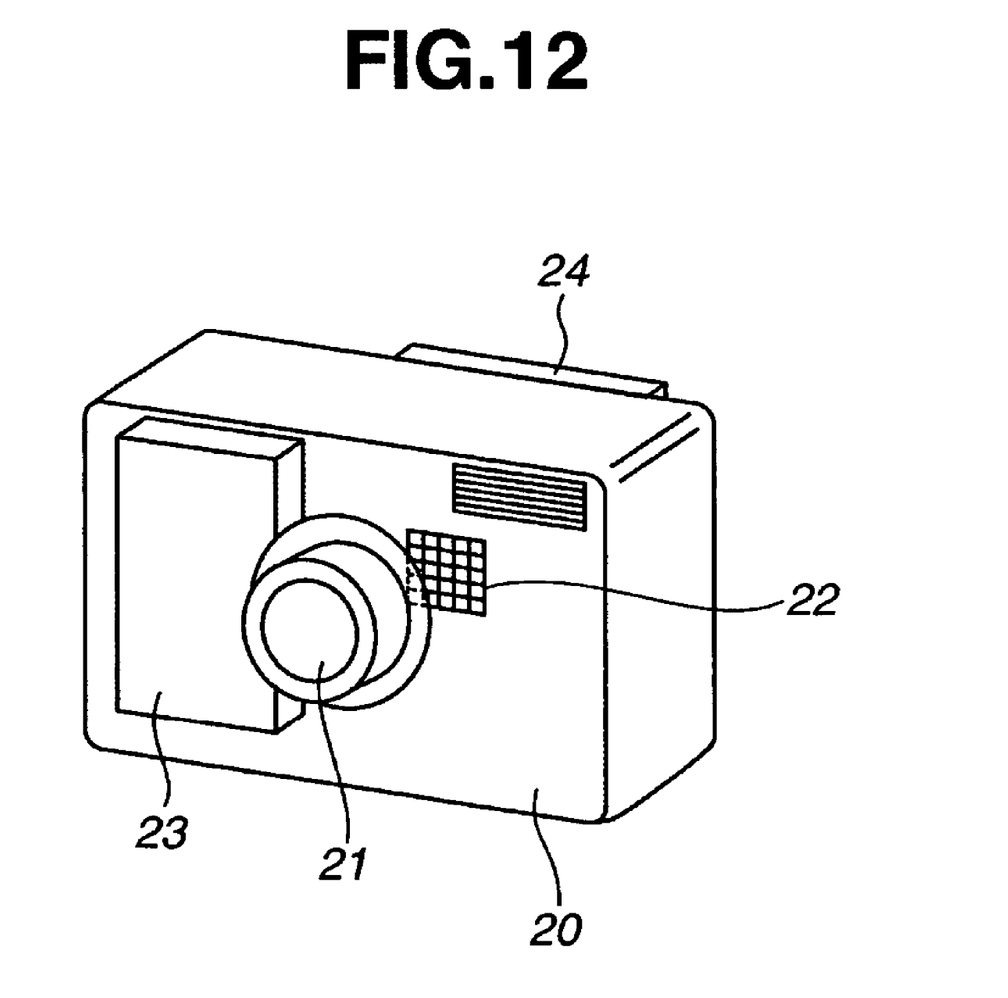
FIG. 12 is a schematic diagram showing a digital still camera.

FIG. 12 is a schematic diagram showing a digital still camera in which a zoom lens according to the present invention is used. Referring to FIG. 12, the digital still camera includes a digital camera body 20, a photographic optical system 21 composed of a zoom lens according to one of the first to fifth embodiments, a solid-state imaging device 22 (photoelectric converter), such as a CCD sensor or a CMOS sensor, arranged to receive an object image formed by the photographic optical system 21, a memory 23 for recording the object image received and photoelectrically converted by the solid-state imaging device 22, and a finder 24 used for observing the object image formed on the solid-state imaging device 22, composed of a liquid crystal display panel or the like.

As described above, by applying a zoom lens according to the present invention to an imaging apparatus such as video camera and a digital still camera, an imaging apparatus which is small in size and has the high optical performance can be implemented.

According to the embodiments described above, the optical material that satisfies the conditions (1) and (2) is implemented by dispersing fine ITO particles into a synthetic resin. However, the fine particle material to be dispersed into the synthetic resin is not limited to ITO, but other fine inorganic oxide particles may be used. Examples include $TiO_2$ (Nd=2.2652, vd=11.8), $Nb_2O_5$ (Nd=2.367, vd=14.0), $Cr_2O_3$ (Nd=2.2178, vd=13.4), and $BaTiO_3$ (Nd=2.4362, vd=11.3).

Moreover, as the resinous material in which the fine inorganic oxide particles are dispersed, a monomer having the following optical constant property can be: a monomer having a relatively small Abbe number, a monomer having a relatively small partial dispersion ratio, or a monomer that satisfies both conditions. While, in the above-described embodiments, PMMA is used as the resinous material, other resinous materials such as N-polyvinyl carbazole and styrene can be used.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-132608 filed on Apr. 28, 2004, which is hereby incorporated by reference herein.

What is claimed is:

1. A zoom lens system, comprising:
  a first lens unit of positive optical power;
  a second lens unit of negative optical power; and
  a lens component including at least one lens unit,
  wherein the first and second lens units and the lens component are respectively provided in order from an object side to an image side,
  wherein at least one of the first lens unit and the second lens unit moves during zooming,
  wherein at least one of the first lens unit, the second lens unit and the at least one lens unit of the lens component includes a layer made of a material having an Abbe number (νIT) and a partial dispersion ratio of g-spectral line and f-spectral line (θIT) satisfying the following conditions:

$11 < \nu IT < 27$ $0.2 < \theta IT < 0.4$, and wherein the layer has an optical power of a sign opposite to that of the at least one of the first and second lens units and the one lens unit of the lens component.

2. A zoom lens system according to claim 1, wherein the first lens unit includes the layer.

3. A zoom lens system according to claim 2, wherein the layer has a focal length (f1a) and the first lens unit has a focal length (f1) satisfying the following condition:

$5 < |f1a/f1| < 60$.

4. A zoom lens system according to claim 2, wherein a focal length of the zoom lens system at the telephoto end (ft) and a focal length of the first lens unit (f1) satisfy the following condition:

$0.5 < f1/ft < 0.9$.

5. A zoom lens system according to claim 2, wherein the first lens unit includes, in order from the object side to the image side, a first lens element of meniscus form of negative optical power having a concave surface facing the image side, a second lens element of positive optical power, and a third lens element of positive optical power.

6. A zoom lens system according to claim 5, wherein the layer is provided on a lens surface of one of the second lens element and the third lens element.

7. A zoom lens system according to claim 1, wherein the second lens unit includes the layer.

8. A zoom lens system according to claim 7, wherein the layer has a focal length (f2a) and the second lens unit has a focal length (f2) satisfying the following condition:

$12 < |f2a/f2| < 20$.

9. A zoom lens system according to claim 7, wherein a focal length of the zoom lens system at the telephoto end (ft) and a focal length of the second lens unit (f2) satisfy the following condition:

$0.10 < |f2/ft| < 0.20$.

10. A zoom lens system according to claim 7, wherein the second lens unit includes, in order from the object side to the image side, a fourth lens element of meniscus form of negative optical power having a concave surface facing the image side, a fifth lens element of negative optical power, and a sixth lens element of positive optical power.

11. A zoom lens system according to claim 1, wherein the lens component includes a third lens unit of positive optical power disposed closest to the object side, and wherein the third lens unit includes the layer.

12. A zoom lens system according to claim 11, wherein the layer has a focal length (f3a) and the third lens unit has a focal length (f3) satisfying the following condition:

$6 < |f3a/f3| < 30$.

13. A zoom lens system according to claim 11, wherein a focal length of the zoom lens system at the telephoto end (ft) and a focal length of the third lens unit (f3) satisfy the following condition:

$0.3 < f3/ft < 0.45$.

14. A zoom lens system according to claim 1, wherein the layer is made of a material including fine Indium Tin Oxide particles dispersed into a resin.

15. A zoom lens system according to claim 1, wherein the zoom lens system forms an image on a photoelectric converter.

16. An imaging apparatus comprising:
  the zoom lens system according to claim 1; and
  a photoelectric converter configured to receive an image formed by the zoom lens system.

* * * * *